(12) United States Patent
Han

(10) Patent No.: US 7,185,660 B1
(45) Date of Patent: Mar. 6, 2007

(54) ARTIFICIAL FINGERNAIL AND METHOD OF MAKING SAME

(75) Inventor: Kyu Sang Han, Port Washington, NY (US)

(73) Assignee: Kiss Nail Products, Inc., Port Washington, NY (US)

( * ) Notice: Subject to any disclaimer, the term of this patent is extended or adjusted under 35 U.S.C. 154(b) by 306 days.

(21) Appl. No.: 10/844,999

(22) Filed: May 13, 2004

(51) Int. Cl. A45D 29/00 (2006.01)
(52) U.S. Cl. .......................... 132/200; 132/73
(58) Field of Classification Search .......... 132/73, 132/200
See application file for complete search history.

(56) References Cited

U.S. PATENT DOCUMENTS

| | | | |
|---|---|---|---|
| 1,135,382 A * | 4/1915 | Kindred | 2/21 |
| 2,199,207 A | 4/1940 | Nolan | |
| 2,234,657 A | 3/1941 | Smaldone | |
| 2,239,040 A | 4/1941 | Holmes | |
| 2,607,356 A * | 8/1952 | Lewis | 132/73 |
| 3,502,088 A | 3/1970 | Jarby | |
| 4,034,769 A | 7/1977 | Nishimura | |
| 4,222,399 A | 9/1980 | Ionescu | |
| 4,511,608 A * | 4/1985 | Ferraro | 428/15 |
| 4,577,648 A | 3/1986 | Dinerstein et al. | |
| 4,632,134 A | 12/1986 | Reid | |
| 4,671,305 A | 6/1987 | Mann | |
| 4,745,934 A | 5/1988 | Mast et al. | |
| 4,751,935 A | 6/1988 | Mast et al. | |
| 4,767,648 A | 8/1988 | Hokama et al. | |
| 4,824,702 A * | 4/1989 | Straub | 428/15 |
| 4,860,774 A | 8/1989 | Becker | |
| 4,876,121 A | 10/1989 | Cohen | |
| 4,884,680 A * | 12/1989 | Israel et al. | 206/457 |
| 4,920,991 A | 5/1990 | Shibahashi et al. | |
| 4,943,462 A | 7/1990 | Komerska et al. | |
| 5,044,384 A | 9/1991 | Hokama et al. | |
| 5,150,726 A | 9/1992 | Rucker | |
| 5,415,903 A | 5/1995 | Hoffman et al. | |
| 5,638,835 A | 6/1997 | Franz et al. | |
| 5,638,837 A | 6/1997 | Juhl et al. | |
| 5,645,090 A | 7/1997 | Juhl et al. | |
| 5,699,813 A | 12/1997 | Carroll | |
| 5,782,248 A | 7/1998 | Chang | |
| 5,860,429 A | 1/1999 | Chang | |
| 5,901,714 A | 5/1999 | Benkart | |
| 5,908,035 A | 6/1999 | Carroll et al. | |

(Continued)

FOREIGN PATENT DOCUMENTS

GB 2 352 628 2/2001

(Continued)

Primary Examiner—Todd E. Manahan
(74) Attorney, Agent, or Firm—Collard & Roe, P.C.

(57) ABSTRACT

An artificial fingernail and method of making an artificial fingernail is provided in which the artificial fingernail is pre-taped with an adhesive layer covered by a removable liner during the manufacturing process. In one aspect, the artificial fingernail includes a polymeric body having a shape corresponding with at least a portion of a natural fingernail. An adhesive layer is secured to at least a portion of the lower surface of the polymeric body. The adhesive layer is adapted to adhere to an upper surface of a wearer's natural fingernail when applied thereto. A removable liner covers the adhesive layer and is removable to expose the adhesive layer for application to the natural fingernail.

5 Claims, 1 Drawing Sheet

U.S. PATENT DOCUMENTS

| | | |
|---|---|---|
| 5,927,293 A | 7/1999 | Halpern |
| 5,944,027 A | 8/1999 | Chang |
| 5,964,977 A | 10/1999 | Sirdesai et al. |
| 6,042,679 A | 3/2000 | Holt et al. |
| 6,196,234 B1 | 3/2001 | Gifford |
| 6,303,140 B1 | 10/2001 | Dever et al. |
| 6,328,039 B1 | 12/2001 | Chang |
| 6,382,217 B2 | 5/2002 | Coker et al. |
| 6,394,100 B1 | 5/2002 | Chang |
| 2005/0022834 A1* | 2/2005 | Hwang, II .................. 132/73 |

FOREIGN PATENT DOCUMENTS

| | | |
|---|---|---|
| JP | 5-56007 | 7/1993 |
| KR | 0130038 | 11/1997 |

* cited by examiner

ARTIFICIAL FINGERNAIL AND METHOD OF MAKING SAME

BACKGROUND OF THE INVENTION

1. Field of the Invention

The present invention relates to artificial fingernails including fingernail extensions and a method of making an artificial fingernail that is pre-taped with adhesive for securing the artificial fingernail to a user's natural fingernail.

2. The Prior Art

It has been known in the art of adorning the hands to provide ornamental fingernail accessories made from thin, molded plastic members manufactured generally in the shape of a fingernail. See, e.g. Chang U.S. Pat. No. 6,394,100. Typically, the wearer must apply an amount of a liquid bonding adhesive to the accessory or the natural nail and affix the accessory to the nail.

An alternative to this process is set forth in U.S. Pat. No. 4,745,934 to Mast et al. which discloses an adhesive press-on tab system for attaching artificial fingernails to the wearer's natural nails. The tabs are essentially double-sided adhesive tape with removable liners that are interposed between the artificial fingernail and the natural fingernail.

Attempts have been made to provide an ornamental fingernail having a pre-applied pressure sensitive layer with varying degrees of success. For example, U.S. Pat. No. 5,415,903 to Hoffman et al. discloses a self adhesive laminate having an adhesive composition made of an acrylic copolymer requiring acrylic acid and titanium chelate ester. U.S. Pat. No. 6,042,679 to Holt et al. discloses that an acrylic pressure sensitive adhesive known in the art can be used in a method for treating damaged fingernails. U.S. Pat. No. 5,044,384 to Hokama et al. discloses that a pressure-sensitive adhesive known in the art can be used in a method for accomplishing a rapid and durable manicure. U.S. Pat. No. 4,860,774 to Becker discloses that a commercially available pressure-sensitive adhesive can be used in a method for fingernail reinforcement.

U.S. Pat. No. 6,394,100 to Chang discloses an ornamental accessory for a fingernail including an overlay having a reusable pressure adhesive layer pre-applied to a bottom surface thereof for application and bonding to the wearer's natural nail, and a method of making the same.

Although a number of artificial fingernails having pre-applied adhesive are known, there is still a need for an artificial fingernail which is easy to manufacture and to use by the consumer.

SUMMARY OF THE INVENTION

An artificial fingernail and method of making an artificial fingernail is provided. In one aspect, the artificial fingernail includes a polymeric body, an adhesive layer, and a removable liner covering the adhesive layer. The polymeric body has a shape corresponding with at least a portion of a natural fingernail and has an upper surface and a lower surface. The adhesive layer is secured to at least a portion of the lower surface and is adapted to adhere to an upper surface of the natural fingernail when applied to the natural fingernail. The removable liner is removable to expose the adhesive layer for application to the natural fingernail.

In another aspect, a method of making an artificial fingernail is provided. In accordance with the method, at least one polymeric body is formed in a well portion of a first mold part. The polymeric body has a shape corresponding with at least a portion of a natural fingernail with a first convex surface and a second concave surface.

A composite strip is disposed over the polymeric body or bodies. The composite strip includes an adhesive layer having first and second layer surfaces. The first layer surface faces the second concave surface(s) of the polymeric body or bodies. The second layer surface is covered by a removable liner.

A second mold part is applied to the first mold part. The second mold part has a least one protruding portion corresponding to the well portion of the first mold part. The protruding portion or portions presses a portion or portions of the composite strip into adhesive contact with the second concave surface(s) of the polymeric body or bodies.

Each polymeric body is removed from the first mold part with the portion of the composite strip adhered to the second concave surface of the polymeric body.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
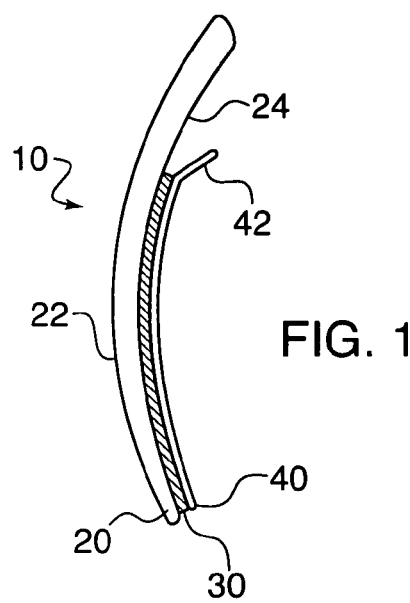
FIG. 1 is a side view of an embodiment of the artificial fingernail of the present invention.
Figure 2:
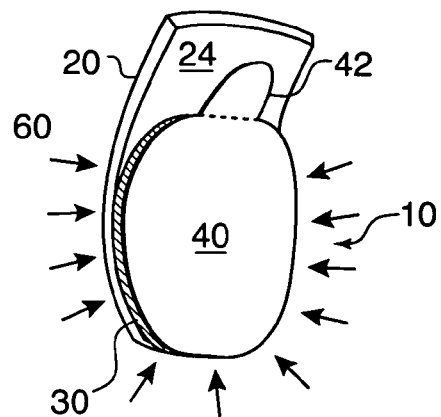
FIG. 2 is a bottom perspective view of the embodiment of FIG. 1.

Turning now in detail to the drawings, FIGS. 1–2 show an artificial fingernail of a preferred embodiment. The term "artificial fingernail" is meant to include both a full-cover nail intended to be applied over the entire surface of a wearer's natural fingernail and a fingernail extension or "nail tip" intended to be applied to a portion of a wearer's natural fingernail.

Artificial fingernail 10 includes a polymeric body 20 corresponding with at least a portion of a natural fingernail. In other words, polymeric body may be designed as a full-cover nail or as a nail tip. Polymeric body 20 may be a conventional plastic artificial fingernail and is preferably made from a mixture of acrylonitrile-butadine-styrene (ABS) plastic and a polycarbonate, but may be made from any plastic-like material commonly employed in the manufacture of artificial nails, such as ABS plastic, nylon, tenite acetate, vinyl acetate, polycarbonates, polyvinyl chloride, etc.

Examples of suitable hard materials for polymeric body 20 are Styrolux® 684D (SBC), a styrene-butadine block copolymer available from BASF Corporation; Cyro® R40 (acrylic base), an acrylic-based multipolymer available from Cyro Industries of Rockaway, N.J.; Lexane KR01 (PC) (trade name), a polycarbonate available from GE Plastics; K-resin® (SBC), a styrene-butadiene copolymer available from Chevron Phillips Chemical Company; TP-UXS (MMBS)(trade name), a methyl methacrylate butadiene styrene terpolymer available from DENKA of Tokyo, Japan; Starex® 5010 (ABS), an acrylonitrile butadiene styrene available from Samsung Cheil Industries; Zylar® 220 (SMMC) and Nas®30, styrene methyl methacrylate copolymers available from Nova Chemicals; and Toyalac 920 (Clear ABS), an acryloritrile butadiene styrene available from Toray Resin Company.

Polymeric body 20 preferably has a thickness between about 0.35 and 0.65 mm. Polymeric body includes an upper surface 22 and a lower surface 24. An adhesive layer 30 is secured to at least a portion of lower surface 24, preferably the proximal portion of lower surface 24. Adhesive layer 30 is adapted to adhere to an upper surface of the natural fingernail when applied to the natural fingernail. Adhesive layer 30 may include a copolymer of acrylic ester and vinyl acetate formed from an aqueous acrylic copolymer emulsion that has been dried on a carrier film.

A removable liner 40 covers adhesive layer 30. Liner 40 is removable from adhesive layer 30 to expose adhesive layer 30 for application to the natural fingernail. Preferably, liner 40 includes a tab 42 for facilitating removal of liner 40 from adhesive layer 30.

Preferably, adhesive layer 30 includes a film including a pressure sensitive adhesive, and removable liner 40 includes a silicon treated paper or plastic film. Preferably, an unsupported laminating film having a thickness between 0.100 and 0.150 mm is used as adhesive layer 30. The film may be a vinyl film coated on each side with an adhesive.

Figure 3:
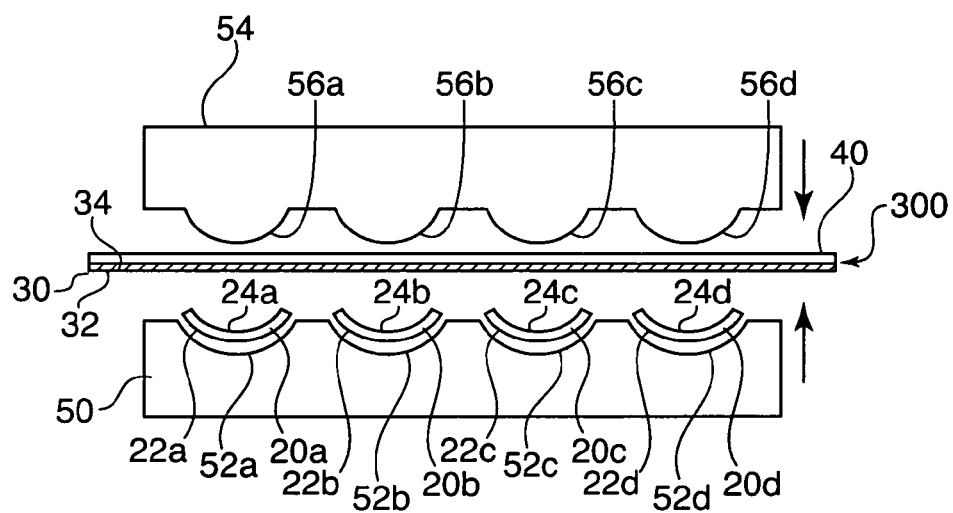
FIG. 3 is a side view of first and second mold halfs used in the process according to the invention.

In another aspect, a method of making an artificial fingernail is provided. The first step in the method is forming at least one polymeric body having a shape corresponding with at least a portion of a natural fingernail. FIG. 3 shows an injection mold including a first mold part 50 for forming the polymeric body, four polymeric bodies 20a, 20b, 20c, 20d being shown. Mold part 50 includes at least one and preferably several cavities or well portions, with four well portions 52a, 52b, 52c, 52d being shown in FIG. 3. Each well portion 52a, 52b, 52c, 52d has the shape, size and thickness of the respective polymeric bodies 20a, 20b, 20c, 20d. Each polymeric body 20a, 20b, 20c, 20d formed in mold part 50 has a first convex surface 22a, 22b, 22c, 22d and a second concave surface 24a, 24b, 24c, 24d.

After forming polymeric bodies 20a, 20b, 20c, 20d, a composite strip 300 is disposed over the polymeric bodies. Composite strip 300 includes an adhesive layer 30 having first and second layer surfaces 32, 34 and a removable liner 40. For example, composite strip 300 may include a pressure sensitive adhesive film covered on one side with a silicon treated paper or plastic film. First layer surface 32 faces second concave surfaces 24a, 24b, 24c, 24d of polymeric bodies 20a, 20b, 20c, 20d. Second layer surface 34 is covered by removable liner 40.

A second mold part 54 is then applied to first mold part 50. Second mold part 54 has at least one and preferably several protruding portions 56a, 56b, 56c, 56d corresponding to well portions 52a, 52b, 52c, 52d of first mold part 50. Protruding portions 56a, 56b, 56c, 56d press respective portions of composite strip 300 into adhesive contact with second concave surfaces 24a, 24b, 24c, 24d respectively of polymeric bodies 20a, 20b, 20c, 20d.

Polymeric bodies 20a, 20b, 20c, 20d are then removed from first mold part 50 with the composite strip portions adhered to the respective concave surfaces 24a, 24b, 24c, 24d of polymeric bodies 20a, 20b, 20c, 20d.

Each composite strip portion is then cut with a die or other cutting tool in the area 60 shown by the arrows in FIG. 2 to form a tab 42 on the composite strip for facilitating removal of liner 40 from adhesive layer 30. The tab is formed by cutting through the adhesive layer but not completely through the liner in the area of tab 42.

Although only at least one embodiment of the present invention has been shown and described, it is to be understood that many changes and modifications may be made there unto without departing from the spirit and scope of the invention as described in the appended claims.

What is claimed is:

1. A method of making an artificial fingernail comprising the steps of:
   (a) forming at least one polymeric body having a shape corresponding with at least a portion of a natural fingernail, a first convex surface and a second concave surface in a well portion of a first mold part;
   (b) disposing a composite strip over said at least one polymeric body, said composite strip comprising an adhesive layer having first and second layer surfaces and a removable liner, said first layer surface facing said second concave surface of said polymeric body, said second layer surface being covered by the removable liner;
   (c) applying a second mold part to said first mold part, said second mold part having at least one protruding portion corresponding to said well portion of said first mold part, wherein said at least one protruding portion presses a portion of said composite strip into adhesive contact with said second concave surface of said polymeric body; and
   (d) removing from said first mold part said polymeric body with said portion of said composite strip adhered to said second concave surface of said polymeric body.

2. The method according to claim 1 further comprising the step of cutting the composite strip to form a tab on said strip for facilitating removal of said liner from said adhesive layer.

3. The method according to claim 1 wherein said composite strip comprises a pressure sensitive adhesive film covered on one side of said film with a silicon treated paper or plastic film.

4. The method according to claim 1 wherein said polymeric body is made from a material selected from the group consisting of acrylonitrile-butadiene-styrene (ABS) plastic, polyvinyl chloride, nylon, tenite acetate, vinyl acetate, polycarbonate, and a mixture of ABS plastic and polycarbonate.

5. The method according to claim 1 wherein said adhesive layer comprises a copolymer of acrylic ester and vinyl acetate formed from an aqueous acrylic copolymer emulsion.

* * * * *